United States Patent
Quigley

[11] Patent Number: 6,149,290
[45] Date of Patent: Nov. 21, 2000

[54] FRONT DISCHARGE CONCRETE VEHICLE HAVING TWO OPERATOR STATIONS IN A CAB ENCLOSURE

[75] Inventor: Thomas Quigley, Oshkosh, Wis.

[73] Assignee: Oshkosh Truck Corporation, Oshkosh, Wis.

[21] Appl. No.: 09/274,895

[22] Filed: Mar. 23, 1999

[51] Int. Cl.$^7$ ....................................................... B28C 5/18
[52] U.S. Cl. ................................ 366/54; 296/64; D12/95
[58] Field of Search ................................ 366/53–63, 220; 296/190.01, 19.08, 63, 64; 180/89.12; D12/1, 4, 82, 93, 95, 96; D15/19

[56] References Cited

U.S. PATENT DOCUMENTS

| D. 291,547 | 8/1987 | Silbernagel . |
|---|---|---|
| 875,210 | 12/1907 | Ravaillier . |
| 3,694,025 | 9/1972 | Buerhig . |
| 5,553,909 | 9/1996 | Sacco et al. . |
| 5,844,998 | 3/1999 | Silbernagel . |

OTHER PUBLICATIONS

"Let Oshkosh Put You Yards Ahead of the Competition" Brochure (4 pages), Oshkosh Truck Corp., Oshkosh, Wisconsin, Nov. 1998.

Primary Examiner—Tony G. Soohoo
Assistant Examiner—Richard W. Ward
Attorney, Agent, or Firm—Foley & Lardner

[57] ABSTRACT

A front discharge concrete vehicle includes a chassis having a front end and a rear end, a mixing drum supported by the chassis having a first end and a second end, a support column extending between the chassis and the second end of the drum to support the second end of the drum and a cab enclosure supported by the chassis below the second end of the drum. The cab enclosure includes an integrally formed housing extending about a first operator station and a second operator station. The cab enclosure further includes at least one control member between the first and second operator stations and an opening extending between the first and second operator stations. The opening extends below the at least one control member to enable the at least one control member to be accessed from both the first operator station and the second operator station.

12 Claims, 5 Drawing Sheets

FRONT DISCHARGE CONCRETE VEHICLE HAVING TWO OPERATOR STATIONS IN A CAB ENCLOSURE

FIELD OF THE INVENTION

The present invention relates to front discharge concrete vehicles. In particular, the present invention relates to a cab enclosure for a front discharge concrete vehicle providing for dual occupancy.

BACKGROUND OF THE INVENTION

Front discharge concrete vehicles or trucks are commonly employed in construction to mix, transport and pour concrete. In contrast to rear discharge concrete vehicles, front discharge concrete vehicles include a drum with an outlet generally supported above a cab enclosure of the vehicle to enable concrete to be discharged and poured through a chute extending forward the vehicle. Because the vehicle discharges concrete at its forward end, the vehicle is better able to supply concrete to locations having limited access.

Although better able to supply concrete to otherwise inaccessible locations, conventional front discharge concrete vehicles are generally restricted to single occupancy cab enclosure due to the extension of the mixing drum above the cab enclosure. Due to the relatively large weight of the drum and concrete, front discharge concrete vehicles require a relatively large support post or column to support the drum above the cab enclosure. Consequently, the available space for the cab enclosure is limited. As a result, this limited space has necessitated the use of single occupancy cab enclosures on front discharge concrete vehicles.

In many situations, it would be desirable to provide the front discharge concrete vehicle with a dual occupant enclosure to transport two individuals to a construction site as well as to train individuals. Conventional front discharge concrete vehicle cab enclosures do not provide this ability. As a result, some attempts have been made to increase the occupancy. In particular, many attempts have been made at mounting an additional cab enclosure beside the already existing cab enclosure. With such attempts, the additional cab enclosure has been bolted to and above the right fender somewhat below the drum. Such attempts have not proved satisfactory for several reasons. First, with such cab enclosure add-ons, the controls for the mixer drum and the work vehicle are generally inaccessible to the operator in the add-on. This is due to the fact that the operator in the cab enclosure add-on and the drum controls in the original cab enclosure are separated by a relatively high side wall which prevents access to the controls. This same wall also interferes with interaction between both cab enclosure occupants. Consequently, such cab enclosure add-ons do not facilitate training or operation of the mixer drum by the operator in the cab enclosure add-on. Second, because such cab enclosure add-ons are generally bolted to the fender or existing cab, such add-ons are viewed as less sturdy and require additional bracing of the fender. Third, because such cab enclosure add-ons must be fit between the support column and the preexisting structure extending behind the original cab enclosure, such cab enclosure add-ons offer little leg room and operator comfort. Furthermore, such add-ons do not typically provide climate control which further reduces the comfort level of the operator in the cab enclosure add-on.

As a result, there is a continuing need for a dual occupancy cab enclosure for a front discharge concrete vehicle which is spacious and sturdy and which provides mixer drum control access to both operators in the cab enclosure.

SUMMARY OF THE INVENTION

A first exemplary embodiment of the present invention provides a front discharge concrete vehicle including a chassis having a front end and a rear end, a mixing drum supported by the chassis having a first end and a second end, a support column extending between the chassis and the second end of the drum to support the second end of the drum and a cab enclosure supported by the chassis below the second end of the drum. The cab enclosure includes a first operator station, a second operator station and an integrally formed housing having a first portion about the first operator station and a second portion about the second operator station. The first portion extends forward the support column. The second portion extends adjacent the first portion and is offset rearwardly relative to first portion The cab enclosure includes an opening extending between the first and second operator stations.

A second embodiment of the present invention provides a cab enclosure for a concrete vehicle. The cab enclosure includes a floor panel, a roof panel, a first front wall, a second front wall, at least one back wall, a first side wall and a second side wall. The first front panel extends between and is integrally connected to the floor and the roof panel. The first front wall includes a first window. The second front wall extends beside the first front wall and is rearwardly offset from the first front wall. The second front wall extends between and is integrally connected to the floor and the roof. The second front wall includes a second window. The at least one back wall extends between and is integrally connected to the floor and the roof. The first side wall extends between and is integrally connected to the floor, the roof, the first front wall and the at least one back wall. The first front wall includes a door opening. The second side wall extends between and is integrally connected to the floor, the roof, the second front wall and the at least one back wall.

A third embodiment of the present invention provides a front discharge concrete vehicle including a chassis having a front end and a rear end, a mixing drum supported by the chassis having a first end and a second end, a support column extending between the chassis and the second end of the drum to support the second end of the drum and an integrally formed cab enclosure supported by the chassis below the second end of the drum. The cab enclosure includes a first operator station extending forward the support column and a second operator station extending adjacent to the first operator station and offset rearwardly relative to the first operator station. The front discharge concrete vehicle further includes at least one control member extending between the first operator station and the second operator station. The cab enclosure includes an opening extending between the first and second operator stations and extending below the at least one control member to enable the at least one control member to be accessed from both the first operator station and the second operator station.

DETAILED DESCRIPTION OF THE PREFERRED EMBODIMENTS

Figure 1:
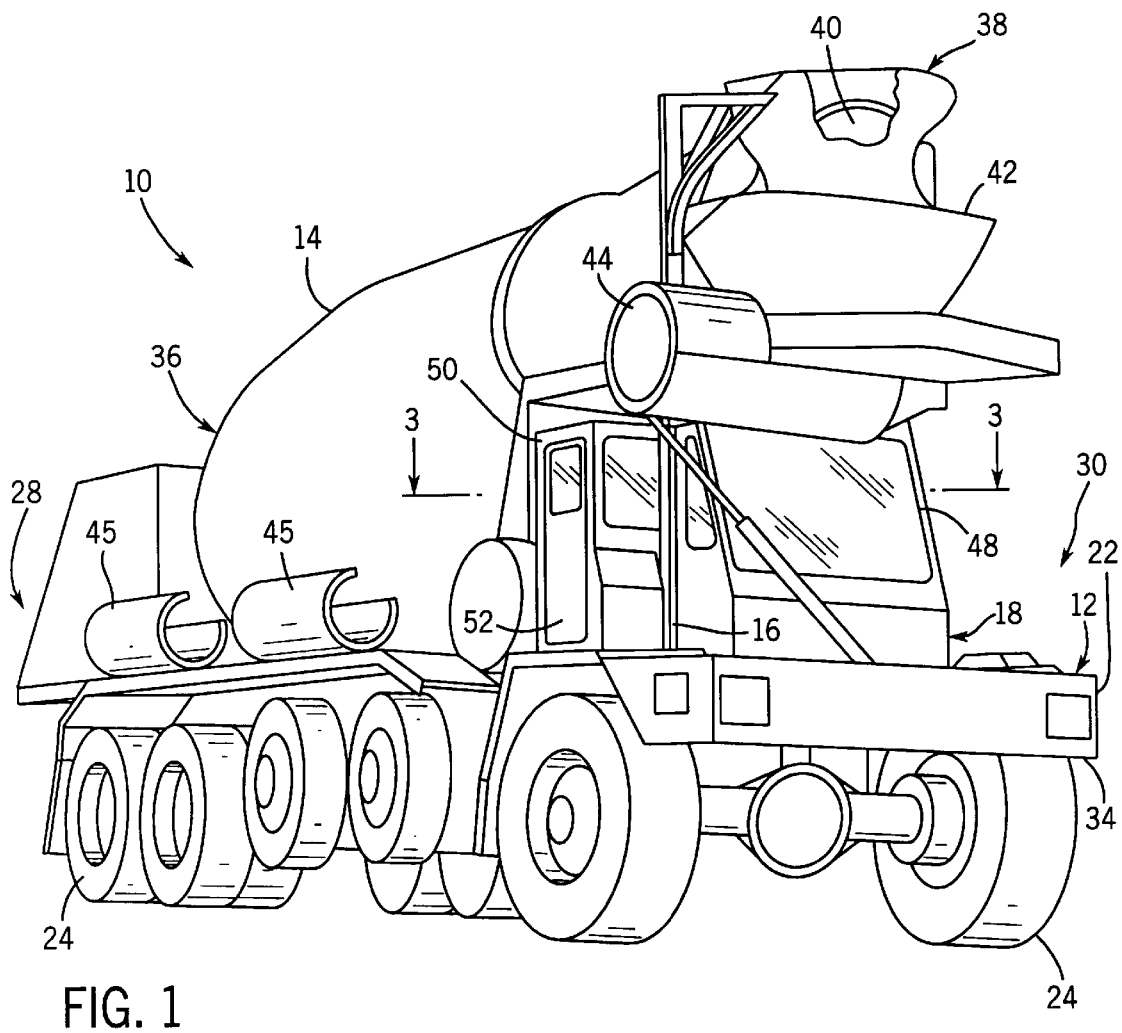
FIG. 1 is front perspective view of a front discharge concrete vehicle including an exemplary cab enclosure of the present invention.

FIG. 1 is a front perspective view of a front discharge concrete vehicle 10 configured to mix, transport and pour concrete. Vehicle 10 generally includes chassis 12, mixing drum 14, support column 16, and cab enclosure 18. Chassis 12 supports mixing drum 14, support column 16, cab enclosure 18 and conventionally known engine, transmission and hydraulic systems (not shown) of vehicle 10. Chassis 12 includes frame 22 and wheels 24. Frame 22 extends from a rear end 28 to a front end 30 of vehicle 10 and is coupled to wheels 24. Frame 22 provides a structural base for supporting drum 14, support column 16 and chassis 18. Frame 22 includes a widened front portion 34 which extends over and about forward most wheels 24 to simultaneously support cabin enclosure 18 and to serve as a fender for the forward most wheels 24. Frame 22 is preferably formed from heat treated carbon manganese steel.

Wheels 24 moveably support frame 22 above the ground or terrain. As will be appreciated, wheels 24 may be replaced by other ground engaging motive members such as tracks.

Mixing drum 14 is conventionally known and is supported by frame 22 of chassis 12. Drum 14 has a first end 36 towards rear 28 and a second end 38 towards front 30 of vehicle 10. Second end 38 extends above cab enclosure 18 and includes an opening 40 through which concrete is emptied from drum 14 into spout 42 and main chute 44 as well as extension chutes 45 (shown disconnected from main chute 44), for distribution of concrete forward front 30 of vehicle 10. Drum 14 is rotated in a conventionally known manner to mix concrete until being emptied through opening 40 into spout 42 and chute 44. Because opening 40, spout 42 and chute 44 extend above cab enclosure 18 and forward front end 30 of vehicle 10, concrete vehicle 10 is better able to supply concrete to hard to reach and otherwise inaccessible locations.

Support column 16, also known as a support post, comprises part of the super structure of vehicle 10 and extends between frame 22 of chassis 12 and end 38 of drum 14. Support column 16 supports end 38 of drum 14 above cab enclosure 18.

Cab enclosure 18 includes housing 46 supported by frame 22 of chassis 12 below end 38 of drum 14. Housing 46 includes two portions 48 and 50 enclosing operator stations 52 and 54, respectively (shown in FIG. 3). Portion 50 is rearwardly offset relative to portion 48 to accommodate support column 16. Portion 50 includes a door 52 and provides cab enclosure 18 with dual occupancy. As a result, work vehicle 10 is capable of transporting two individuals and facilitates training.

Figure 2:
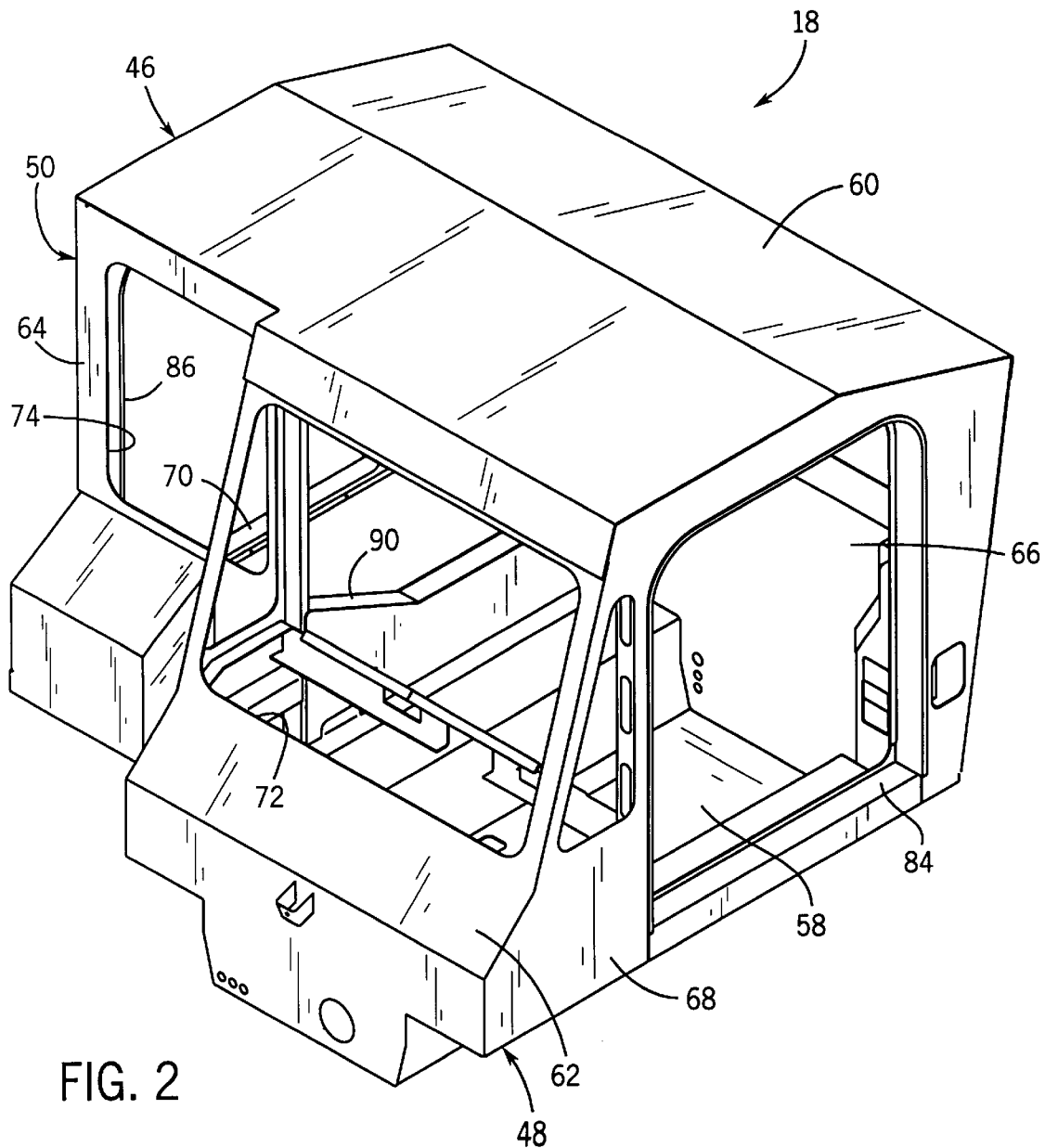
FIG. 2 is a front perspective view of a housing of the cab enclosure of FIG. 1.

FIG. 2 is a front perspective view of housing 46 of cab enclosure 18. As by shown by FIG. 2, housing 46 is integrally formed such that housing 46 includes floor panel 58, roof panel 60, first front wall 62, second front wall 64, a back wall 66, a side wall 68 and a side wall 70. Floor panel 58 is a single unitary panel that extends below and supports front wall 62, 64, rear wall 66 and side walls 68, 70 as well as roof 60. Roof panel 60 comprises a single unitary panel integrally connected to front wall 62, 64, side wall 68, 70 and back wall 66. Floor panel 58 provides a floor for both portions 48 and 50 of cab enclosure 15. Likewise, roof panel 60 provides a roof for both portions 48 and 50 of cab enclosure 18. As a result, housing 46 of cab enclosure 18 is more vibration resistant and sturdy as compared to prior cab enclosures in which an add-on portion was bolted to an existing portion to provide for dual occupancy. Moreover, because each panel or wall of housing 46 is supported by a single unitary floor panel 58, housing 46 of cab enclosure 18 is more easily manufactured and more easily mounted onto frame 22 of chassis 12. Housing 46 is preferably formed from aluminum. Because housing 46 has an integrally formed unitary floor panel 58, additional bracing of the fender below portion 50 is not needed.

Front wall 62 and front wall 64 are composed of several individual panels integrally connected to one another, preferably by welding. Front wall 62 extends between and is integrally connected to floor panel 58 and roof panel 60 while defining a window 72. Front wall 62 is preferably configured to extend forward of operator station 52 (shown in FIG. 3).

Front wall 64 extends beside front wall 62 and is rearwardly offset from front wall 62. As a result, housing 46 accommodates support column 16 (shown in FIG. 1). Front wall 64 extends between and is integrally connected to floor panel 58 and roof panel 60. Front wall 64 further defines a window 74. In the exemplary embodiment, front wall 64 extends forward of operator station 54 (shown in FIG. 3). Overall, front wall 62 and front wall 64 provide a front housing and front windshield configured to extend forward of operator station 52 and 54 while accommodating support column 16 as well as extension chutes 45 connected to main chute 44.

Back wall 66 extends generally opposite to front walls 62 and 64 and preferably comprises multiple panels integrally connected to and extending between floor panel 58 and roof panel 60. As by shown by FIG. 3, back wall 66 preferably includes back panels 78 and 80. Back panel 80 is rearwardly offset relative to back panel 78. As a result, portion 50 of housing 46 provides additional room for operator station 54. This is extremely advantageous since support column 16 necessitates that portion 50 be rearwardly offset from portion 48 of housing 46.

Side wall 68 extends between and is integrally connected to floor panel 58, roof panel 60, front wall 62 and back wall 66. Side wall 68 includes a door opening 84 for reception of a door (not shown). Side wall 70 extends opposite side wall 68. Side wall 70 extends between and is integrally connected to floor panel 58, roof panel 60, front wall 64 and back wall 66. Side wall 70 includes a door opening 86 for reception of a door (not shown).

Overall, housing 46 provides a rigid sturdy enclosure configured to receive components of operator stations 52 and 54. Housing 46 further defines an opening 90 extending between portions 48 and 50 of housing 46 and between operator stations 52 and 54 contained therewith, respectively. Because housing 46 is preferably integrally formed using a single floor panel 58, housing 46 is sufficiently rigid such that opening 90 is enlarged to provide improved interfacing between operator stations 52 and 54. Although less desirable, floor panel 58 or roof panel 60 may alternatively be composed of multiple panels which are integrally connected.

Figure 3:
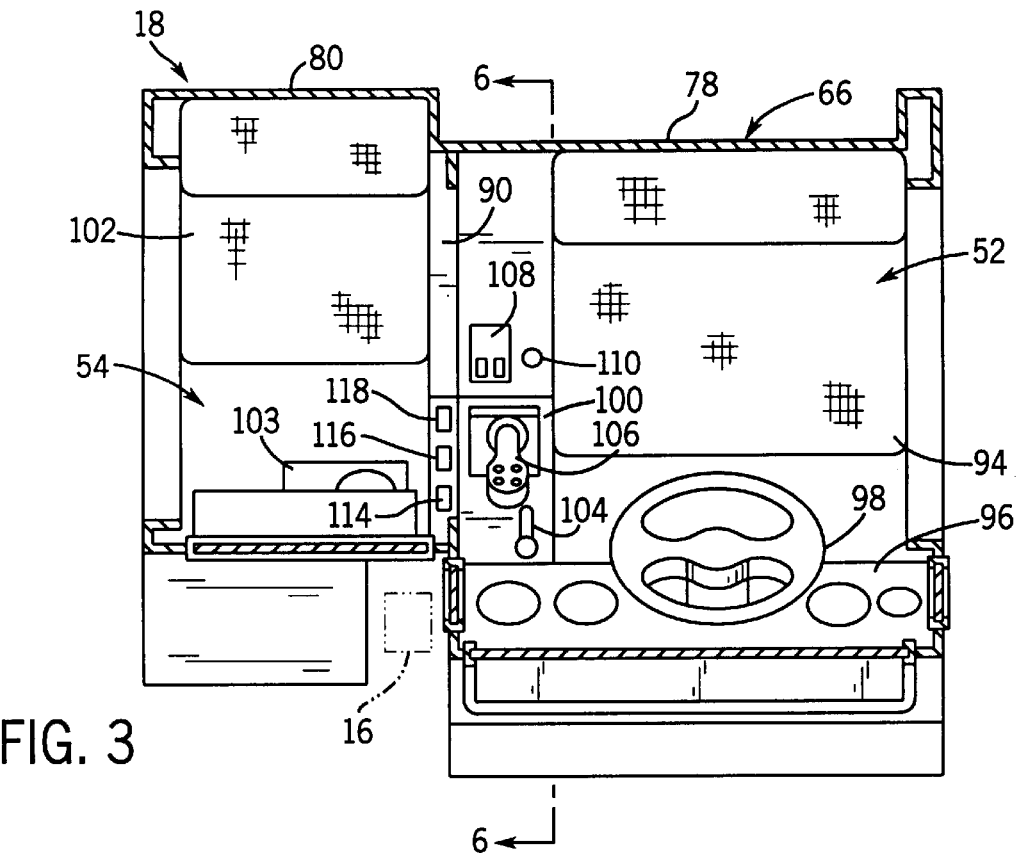
FIG. 3 is a sectional view of the cab enclosure of FIG. 1 taken along lines 3—3.

FIGS. 3–6 illustrate operator stations 52 and 54 as well as opening 90 in greater detail. As best shown by FIG. 3, operator station 52 includes operator seat 94, steering console 96, steering wheel 98 and control console 100. Operator station 54 includes operator seat 102 and heater 103. Operator seat 94 extends between front wall 62 and back panel 78 of rear wall 66 and is configured to support an operator within reach of steering wheel 98 and control console 100. Steering console 96 extends adjacent front wall 62 and is preferably partially received within a cavity defined by front wall 62. Steering control console 96 provides other controls for vehicle 10 while supporting steering wheel 98. Steering wheel 98 extends rearward from steering wheel console 96 and steers vehicle 10 in a conventionally known manner.

Figure 4:
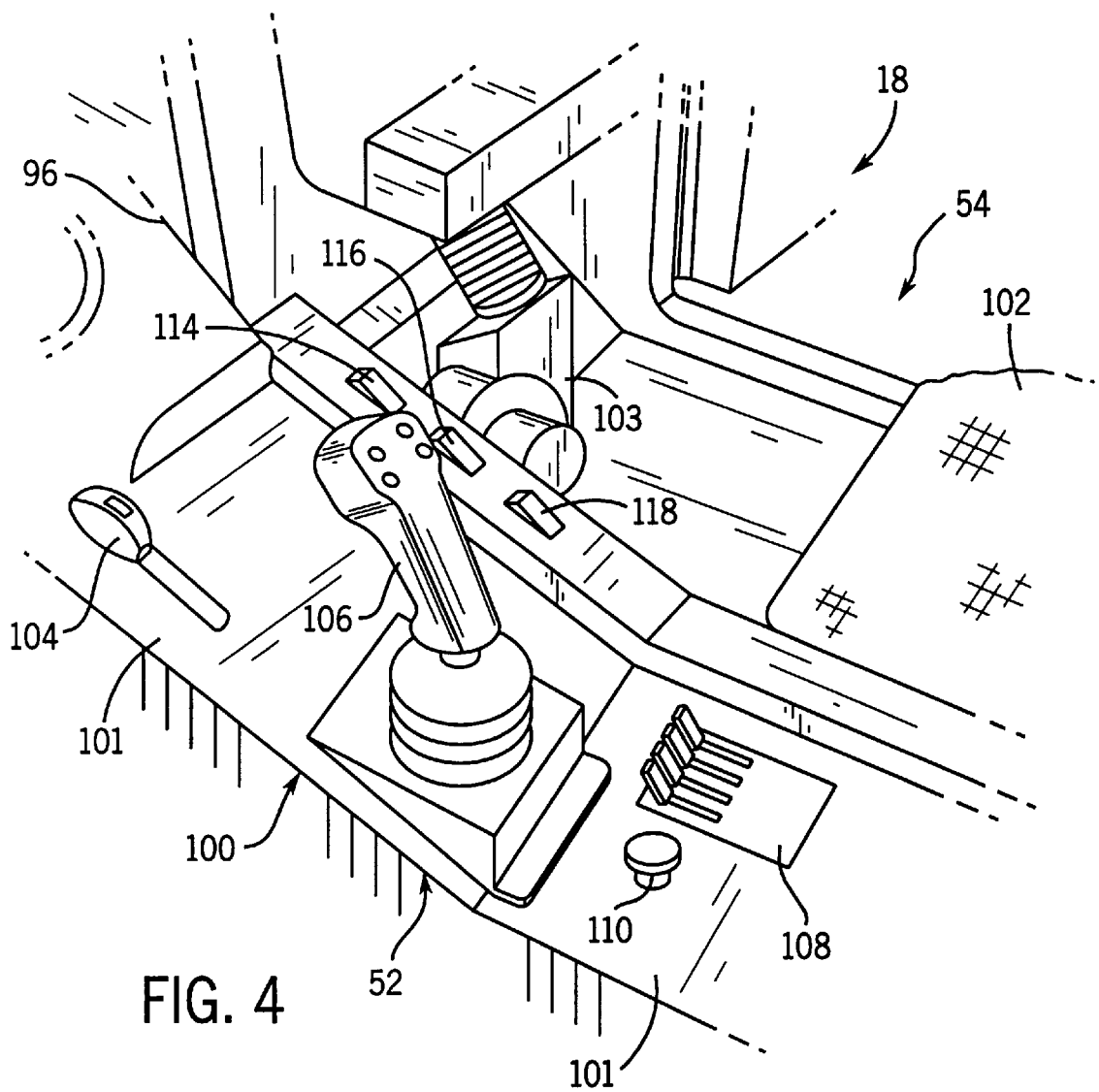
FIG. 4 is a fragmentary perspective view of a first interior portion of the cab enclosure of FIG. 3.

Control console 100 extends generally between steering control console 96 and back panel 78 of back wall 66. Control console 100 further extends adjacent to opening 90 and adjacent to operator station 54. As best shown by FIG. 4, control console 100 includes multiple control members configured to operate vehicle 10 including drum 14 (shown in FIG. 1). In the exemplary embodiment, control console 100 includes mixer or drum control 104, joystick 106, control 108 and control 110. Mixer control 104 is conventionally known and is configured to control the speed and direction of the rotation of drum 14 in a conventionally known manner. Joystick 106 extends from console 100 and is configured, in a conventionally known manner, to control the direction and inclination of chute 44. Controls 108 preferably comprise slide controls configured to control heaters. Control 110 is a pull knob configured to actuate the parking break (not shown) of vehicle 10. As will be appreciated, control console 100 may be provided with a few or greater control members or devices.

Figure 6:
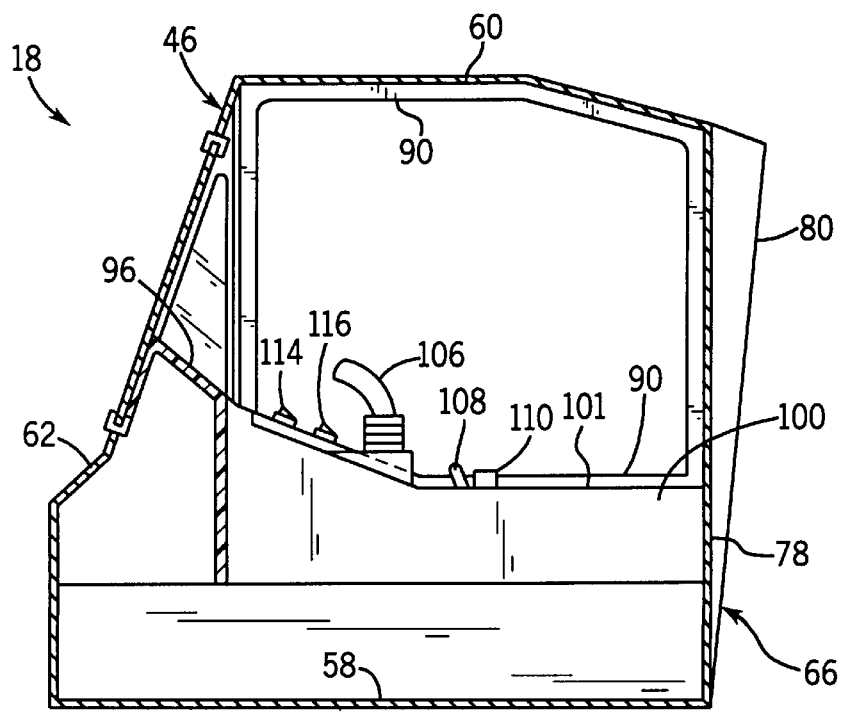
FIG. 6 is a sectional view of the cab enclosure of FIG. 3 taken along lines 6—6.

As best shown by FIG. 6, opening 90 substantially extends from steering control console 96 to back panel 78 and from roof panel 60 to a location proximate to control console 100. In the exemplary embodiment, opening 90 extends to approximately 0.5 inches above a top surface 101 of console 100. In particular, opening 90 extends between operator stations 52 and 54 and below joystick 106, control 108 and control 110. As a result, opening 90 enables an operator positioned at operator station 54 to visually and physically access joystick 106 as well as controls 104, 108 and 110. Thus, opening 90 facilitates interaction between an operator positioned at operator station 52 and a second operator positioned at operator station 54 during training. In addition, the operator positioned at operator station 54 can control drum 14 as well as the positioning of chute 44 and extension chutes 45 to supply concrete to particular locations. Opening 90 further enables a single operator to control chutes 44 and 45 by quickly and easily entering either side of cab enclosure 18 without having to walk around rear 28 or front 30 of vehicle 10.

Figure 5:
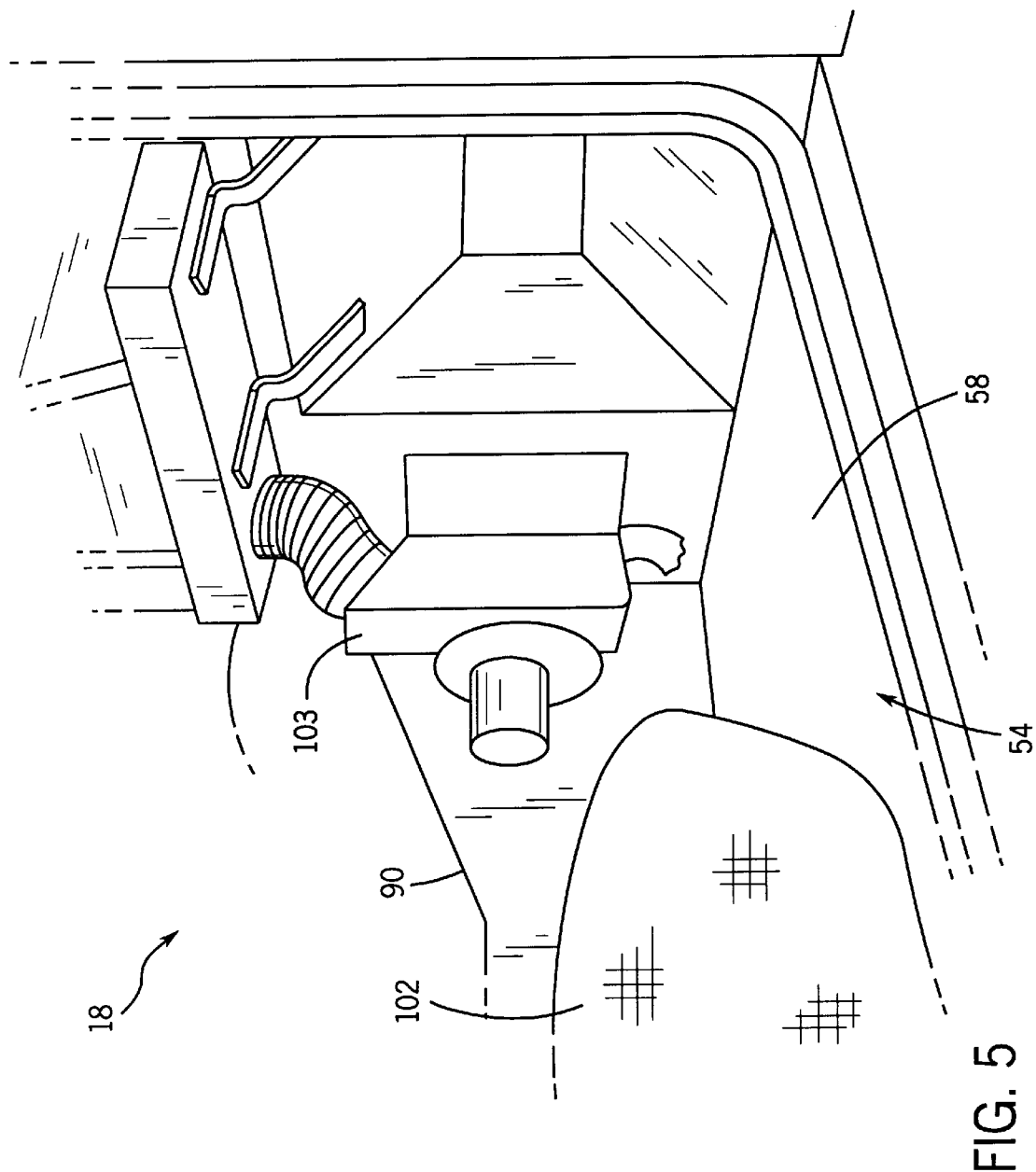
FIG. 5 is a fragmentary perspective view of a second interior portion of the cab enclosure of FIG. 3.

As further shown by FIGS. 3 and 5, control console 100 additionally includes rocker switch controls 114, 116 and 118. Rocker switch controls 114, 116 and 118 control wipers (not shown) for operator station 54, a windshield washer (not shown) for operator station 54 and a heater fan (not shown), respectively. Because cab enclosure 18 includes separate heaters for operator stations 52 and 54, cab enclosure 18 provides dual climate control for improved operator comfort.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A front discharge concrete vehicle comprising:
    a chassis having a front end and a rear end;
    a mixing drum supported by the chassis, the drum having a first end and a second end;
    a support column extending between the front end of the chassis and the second end of the drum to support the second end of the drum; and
    a cab enclosure supported by the chassis below the second end of the drum, the cab enclosure including a first operator station, a second operator station, and an integrally formed housing;
    said housing having a first portion about the first operator station, and a second portion about the second operator station extending adjacent to the first portion and offset rearwardly relative to the first portion;
    wherein the cab enclosure includes an opening extending between the first and second operator stations;
    the first housing portion comprises a first front wall extending forward the support column;
    the second housing portion comprises a second front wall rearwardly offset relative to the first front wall; and
    the support column is located directly forward said second front wall.

2. The vehicle of claim 1 wherein the first operator station includes a vehicle steering control.

3. The vehicle of claim 1 including at least one control member between the first and second operator stations, wherein the opening extends below the at least one control member.

4. The vehicle of claim 3 including a control console having a top and supporting the at least one control member, wherein the opening extends proximate to the top of the control console.

5. The vehicle of claim 1 wherein the first operator station includes a first operator seat and wherein the second operator station includes a second operator seat, the second operator seat being rearwardly offset from the first operator seat.

6. The vehicle of claim 1 wherein the cab enclosure includes a unitary floor panel providing a floor below the first and second operator stations.

7. The vehicle of claim 1 wherein the cab enclosure includes a first wall extending behind the first operator station and a second wall extending behind the second operator station, the second wall being rearwardly offset from the first wall.

8. A front discharge concrete vehicle comprising:
    a chassis having a front end and a rear end;
    a mixing drum supported by the chassis, the drum having a first end and a second end;
    a support column extending between the front end of the chassis and the second end of the drum it Support the second end of the drum;
    a cab enclosure supported by the chassis below the second end of the drum, the cab enclosure including a housing, a first operator station, and a second operator station extending adjacent to the first operator station and offset rearwardly relative to the first operator station; and
    at least one control member between the first and second operator stations;
    wherein the cab enclosure includes an opening extending between the first and second operator stations and below the at least one control member to enable the at least one control member to be accessed from both the first operator station and the second operator station;

a first housing portion about said first operator station comprises a first front wall extending forward the support column;

a second housing portion about said second operator station comprises a second front wall rearwardly offset relative to the first front wall; and the support column is located directly forward said second front wall.

9. The vehicle of claim 8, including a control console having a top and supporting the at least one control member, wherein the opening extends proximate to the top of the control console.

10. The vehicle of claim 8, wherein the cab enclosure includes a unitary floor panel providing a floor below the first and second operator stations.

11. The vehicle of claim 8, wherein the first operator station includes a first operator seat and wherein the second operator station includes a second operator seat, the second operator seat being rearwardly offset from the first operator seat.

12. The vehicle of claim 8, wherein the cab enclosure includes a first wall extending behind the first operator station and a second wall extending behind the second operator station, the second wall being rearwardly offset from the first wall.

* * * * *